(12) United States Patent
Hebbalaguppe et al.

(10) Patent No.: US 10,360,247 B2
(45) Date of Patent: Jul. 23, 2019

(54) SYSTEM AND METHOD FOR TELECOM INVENTORY MANAGEMENT

(71) Applicant: Tata Consultancy Services Limited, Mumbai (IN)

(72) Inventors: Ramya Sugnana Murthy Hebbalaguppe, Gurgaon (IN); Ehtesham Hassan, Gurgaon (IN); Gaurav, Gurgaon (IN); Hiranmay Ghosh, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/922,572

(22) Filed: Mar. 15, 2018

(65) Prior Publication Data

US 2018/0276241 A1  Sep. 27, 2018

(30) Foreign Application Priority Data

Mar. 24, 2017 (IN) .............................. 201721010459

(51) Int. Cl.
*H04N 13/00* (2018.01)
*G06F 16/29* (2019.01)
(Continued)

(52) U.S. Cl.
CPC ................ *G06F 16/29* (2019.01); *G01S 5/00* (2013.01); *G06K 9/00214* (2013.01); *G06K 9/00671* (2013.01); *G06Q 10/087* (2013.01)

(58) Field of Classification Search
CPC ............... H04N 5/265; H04N 13/0497; H04N 13/0014; H04N 13/0282; H04N 5/23293;
(Continued)

(56) References Cited

U.S. PATENT DOCUMENTS

| 6,919,880 B2 | 7/2005 | Morrison et al. |
| 9,042,657 B2 | 5/2015 | Janky et al. |

(Continued)

FOREIGN PATENT DOCUMENTS

CN        106022232 A      10/2016

OTHER PUBLICATIONS

Tsai, V. et al., "Feature Positioning on Google Street View Panoramas", ISPRS Annals of the Photogrammetry, Remote Sensing and Spatial Information Sciences, ISPRS, vol. 1-4, Sep. 1, 2012, pp. 305-309.

(Continued)

*Primary Examiner* — Phuoc H Doan
(74) *Attorney, Agent, or Firm* — Finnegan, Henderson, Farabow, Garrett & Dunner LLP

(57) ABSTRACT

This disclosure relates generally to telecom inventory management, and more particularly to telecom inventory management via object recognition and localization using street-view images. In one embodiment, the method includes obtaining street-view images of a geographical area having telecom assets. The telecom assets are associated with corresponding GPS location coordinates. An object recognition model is applied to the street-view images to detect the telecom assets therein. Detecting the telecom assets includes associating the telecom assets with corresponding asset labels. A real-world location of the telecom assets is estimated in the geographical area by applying triangulation method on a set of multi-view images selected from the street-view images. The set of multi-view images are captured from a plurality of consecutive locations in vicinity of the telecom asset in the geographical area. The GPS location coordinates of the telecom assets are validated based at least on the estimated real-world location.

17 Claims, 6 Drawing Sheets

(51) Int. Cl.
*G06K 9/00* (2006.01)
*G01S 5/00* (2006.01)
*G06Q 10/08* (2012.01)

(58) Field of Classification Search
CPC ... H04N 5/23238; H04N 5/23296; G06T 7/74
USPC .................. 345/156, 420; 715/725; 348/349
See application file for complete search history.

(56) References Cited

U.S. PATENT DOCUMENTS

| | | | |
|---|---|---|---|
| 9,412,076 B2 | 8/2016 | Sapiro et al. | |
| 2013/0329124 A1* | 12/2013 | Nagamatsu | H04N 5/23212 |
| | | | 348/349 |
| 2018/0253827 A1* | 9/2018 | Holzer | H04N 13/00 |

OTHER PUBLICATIONS

Goodfellow, I., "Multi-digit Number Recognition from Street View Imagery using Deep Convolutional Neural Networks", Computer Vision and Pattern Recognition, ArXiv, Apr. 14, 2014, pp. 1-13.

* cited by examiner

|  | ACTUAL OBJECT CATEGORIES | | | | |
|---|---|---|---|---|---|
| PREDICTED OBJECT CATEGORIES | | CABINET | JOINTBOX | MANHOLE | POLE | BACKGROUND |
| | CABINET | 84.76 | 0 | 0 | 0 | 18.07 |
| | JOINTBOX | 0 | 59.86 | 3.06 | 0 | 31.93 |
| | MANHOLE | 0 | 2.32 | 46.94 | 0 | 38.24 |
| | POLE | 0 | 0 | 0 | 17.39 | 11.76 |
| | BACKGROUND | 15.24 | 37.62 | 50 | 82.6 | 0 |

SYSTEM AND METHOD FOR TELECOM INVENTORY MANAGEMENT

PRIORITY CLAIM

This U.S. patent application claims priority under 35 U.S.C. § 119 to: India Application No. 201721010459, filed on Mar. 24, 2017. The entire contents of the aforementioned application are incorporated herein by reference.

TECHNICAL FIELD

This disclosure relates generally to telecom inventory management, and more particularly, to telecom inventory management via object recognition and localization using street-view images.

BACKGROUND

Over last few decades, telecom industry has seen an exponential growth in technology and thus its customer base. The changes in technology and the increasing expectations of customers have put Telecom companies under tremendous pressure to overhaul their networks, and corresponding equipment swiftly. Telecom companies also need to keep their costs under control to keep shareholders happy and satisfied. This requires the need to have accurate knowledge of their on the ground and under-ground telecom assets with their corresponding location to upgrade from copper to fiber network. Asset inventory management, hence, is a challenging problem for many organizations which provide infrastructural services such as telecommunication, power utilities, transport amongst others.

SUMMARY

Embodiments of the present disclosure present technological improvements as solutions to one or more of the above-mentioned technical problems recognized by the inventors in conventional systems. For example, in one embodiment, a processor implemented method for telecom inventory management is provided, where the method includes obtaining a plurality of street-view images of a geographical area having one or more telecom assets, via one or more hardware processors. The one or more telecom assets are associated with corresponding Global Positioning System (GPS) location coordinates. Further, the method includes applying an object recognition model to the plurality of street-view images to detect the one or more telecom assets in the plurality of street-view images, via the one or more hardware processors. Detecting the one or more telecom assets includes associating the one or more telecom assets with corresponding asset labels. Furthermore, the method includes estimating a real-world location of the one or more telecom assets in the geographical area by applying triangulation method on a set of multi-view images selected from the plurality of street-view images, via the one or more hardware processors. The set of multi-view images are captured from a plurality of consecutive locations in vicinity of the one or more telecom asset in the geographical area. Moreover, the method includes validating the GPS location coordinates of the one or more telecom assets based at least on the estimated real-world location, via the one or more hardware processors.

In another embodiment, a system for telecom inventory management is provided. The system includes one or more memories; and one or more hardware processors, the one or more memories coupled to the one or more hardware processors, wherein the one or more hardware processors are configured by programmed instructions stored in the one or more memories to obtain a plurality of street-view images of a geographical area having one or more telecom assets. The one or more telecom assets are associated with corresponding GPS location coordinates. Further, the one or more hardware processors are capable of executing programmed instructions to apply an object recognition model to the plurality of street-view images to detect the one or more telecom assets in the plurality of street-view images. Detecting the one or more telecom assets includes associating the one or more telecom assets with corresponding asset labels. Furthermore, the one or more hardware processors are capable of executing programmed instructions to estimate a real-world location of the one or more telecom assets in the geographical area by applying triangulation method on a set of multi-view images selected from the plurality of street-view images. The set of multi-view images are captured from a plurality of consecutive locations in vicinity of the one or more telecom asset in the geographical area. Moreover, the one or more hardware processors are capable of executing programmed instructions to validate the GPS location coordinates of the one or more telecom assets based at least on the estimated real-world location.

In yet another embodiment, a non-transitory computer-readable medium having embodied thereon a computer program for executing a method for telecom inventory management is provided. The method includes obtaining a plurality of street-view images of a geographical area having one or more telecom assets. The one or more telecom assets are associated with corresponding GPS location coordinates. Further, the method includes applying an object recognition model to the plurality of street-view images to detect the one or more telecom assets in the plurality of street-view images. Detecting the one or more telecom assets includes associating the one or more telecom assets with corresponding asset labels. Furthermore, the method includes estimating a real-world location of the one or more telecom assets in the geographical area by applying triangulation method on a set of multi-view images selected from the plurality of street-view images. The set of multi-view images are captured from a plurality of consecutive locations in vicinity of the one or more telecom asset in the geographical area. Moreover, the method includes validating the GPS location coordinates of the one or more telecom assets based at least on the estimated real-world location.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 7B illustrate a confidence matrix heat map plot for various object detection models employed to detect telecom assets in accordance with some embodiments of the present disclosure.

DETAILED DESCRIPTION

Figure 1:
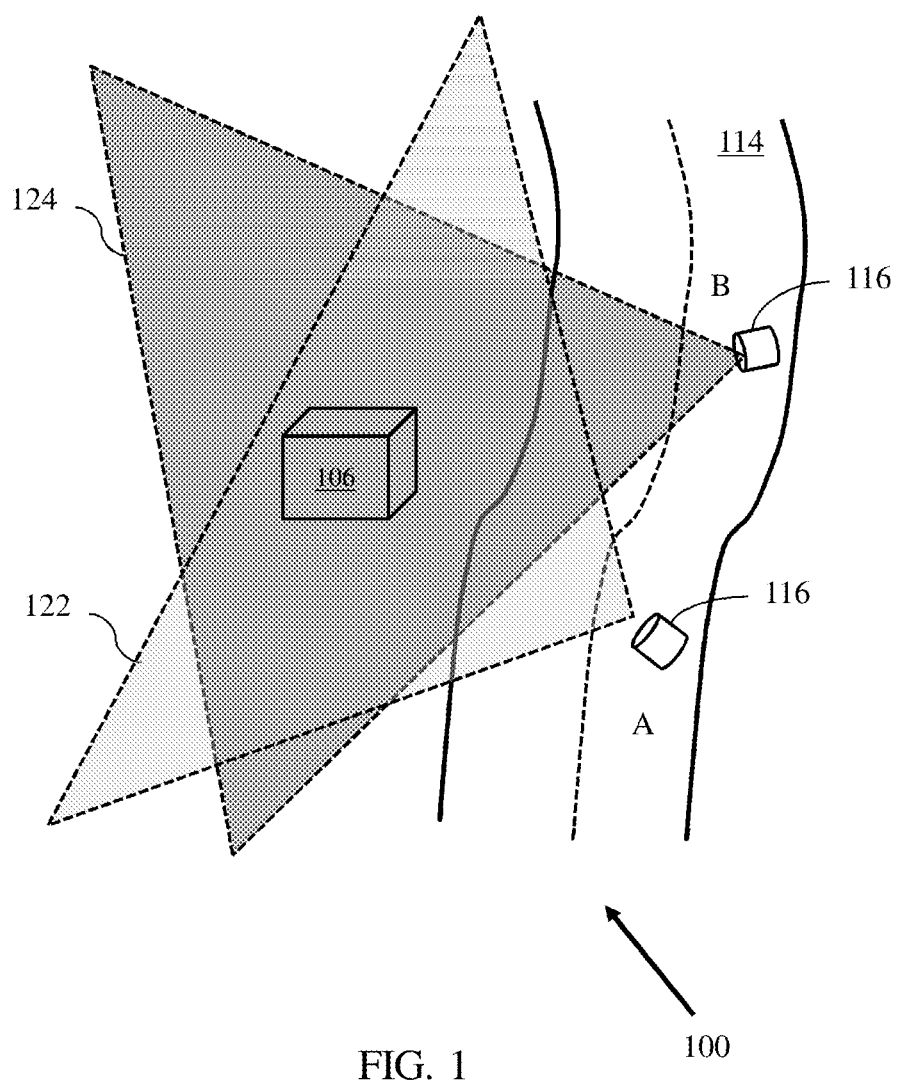
FIG. 1 illustrates an exemplary representation of capturing street-view images using a multi-view set up according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Systems and methods for telecom inventory management are disclosed in present subject. In general, due to a technology upsurge in telecom sector, the telecom companies are under a constant pressure to overhaul their networks, and corresponding equipment swiftly. Telecom companies also need to keep their costs under control to keep shareholders happy. This means that the telecom companies need to have an accurate knowledge of their on the ground and under-ground assets with their corresponding location to upgrade from copper to fibre network.

Typically, telecom companies engage with surveyors that undertake surveys to monitor the telecom equipment. For example, in case the telecom assets are to be upgraded from copper to fiber networks, the surveyors are required to manually look for over-ground and under-ground telecom assets and update the corresponding location of said assets. Hence, asset inventory management involves labor intensive tasks that may be inaccurate too. Moreover, the data updated in field surveys are time consuming, resource intensive and prove costly.

While several Telecom companies have started to leverage Geographic Information System (GIS) based asset management system capabilities, a significant percentage of asset data in such systems is incomplete or inaccurate. Creating a comprehensive telecom inventory on the condition of all assets is challenging due to the high-volume of data that must be collected. The Telecom companies incur high cost due to manual labour for surveys. Inaccurate data leads to: (a) delays in the planning phase if new equipment is added (b) need for additional surveys before plan finalization (c) delays in lead to cash as customer order fulfillment is impacted.

Various embodiments disclosed herein provide methods and systems for asset inventory management such that the aforementioned limitations of the conventional telecom asset management systems can be negated. For example, in an embodiment, the disclosed method reduces the survey requirement by identifying over-ground inventory details from street-view imagery using leading edge algorithms that utilize computer vision techniques based on object recognition/localisation. The use of the street-view imagery helps to get the survey done at a computing device, for example, a desktop, a tablet and the like, with great ease circumventing manual labour. The street view images provide an ability to view a geographical area from a "street view" perspective. The street-view images may be captured by, for example, a vehicle-mounted camera and/or contributed by individuals that are stitched together to create panoramic appearances of the corresponding surrounding geographical area. Said street-view images are captured as the vehicle drives along a street. At every geographical area, multiple images corresponding to multiple direction angles may be taken to capture a 360 degree view of the geographical area. For example, a vehicle-mounted image capturing device may utilizes nine different lenses that capture eight different street view images at different direction angle increments from a specific geographical area. Herein, the multiple images corresponding to multiple direction angles of an object may be referred to as multi-view images. An example of capturing the multi-view images is illustrated in FIG. 1.

Referring to FIG. 1, an example representation 100 of capturing street-view images using a multi-view set up is illustrated. As illustrated a telecom asset for example, a cabinet 102 is installed on one side of a street 114. The multi-view set up may include an image capturing device 116 that may capture images of the cabinet 102 from multiple locations such as a location 118 and a location 120. On position the image capturing device 116 at the location A, the image capturing device 116 may have a field of view 122, while on position the image capturing device 116 at the location B, the image capturing device 116 may have a field of view 124. As is shown, the fields of view 122, 124 have a finite degree of scene overlap.

The images captured by image capturing device upon being located at the locations A and B may be referred to as multi-view images since the images capture same object from different points of view. The captured street-view images include GPS coordinates of the image capturing device corresponding to each of the street-view image. Said street-view images and the GPS coordinates associated therewith may be stored in a repository, for instance a repository in a cloud.

Herein, the street-view images provide a human head view of the scene. However, recognizing objects at the ground level, for example manholes and/or joint boxes, may be difficult in the street-view images. Moreover, the telecom assets at the ground level may include lot of clutter and have significantly different point of views. Additionally, many of telecom assets bear significant resemblance with the surroundings, thereby making detection thereof difficult. In order to circumvent the aforementioned challenges, the disclosed method estimates a real-world location/position of telecom assets using GPS co-ordinates derived from the street-view images. In an embodiment, the pipeline plays critical role in prioritizing the maintenance or replacement of assets. The method detects assets by using an object detection model, for example, by using robust fast region based convolution network (R-CNN) model.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for telecom inventory management shall be implemented, has been explained in details with respect to the FIGS. 1 through 7B. While aspects of described methods and systems for telecom inventory management can be implemented in any number of different systems, utility environments, and/or configurations, the embodiments are described in the context of the following exemplary system(s).

Figure 2:
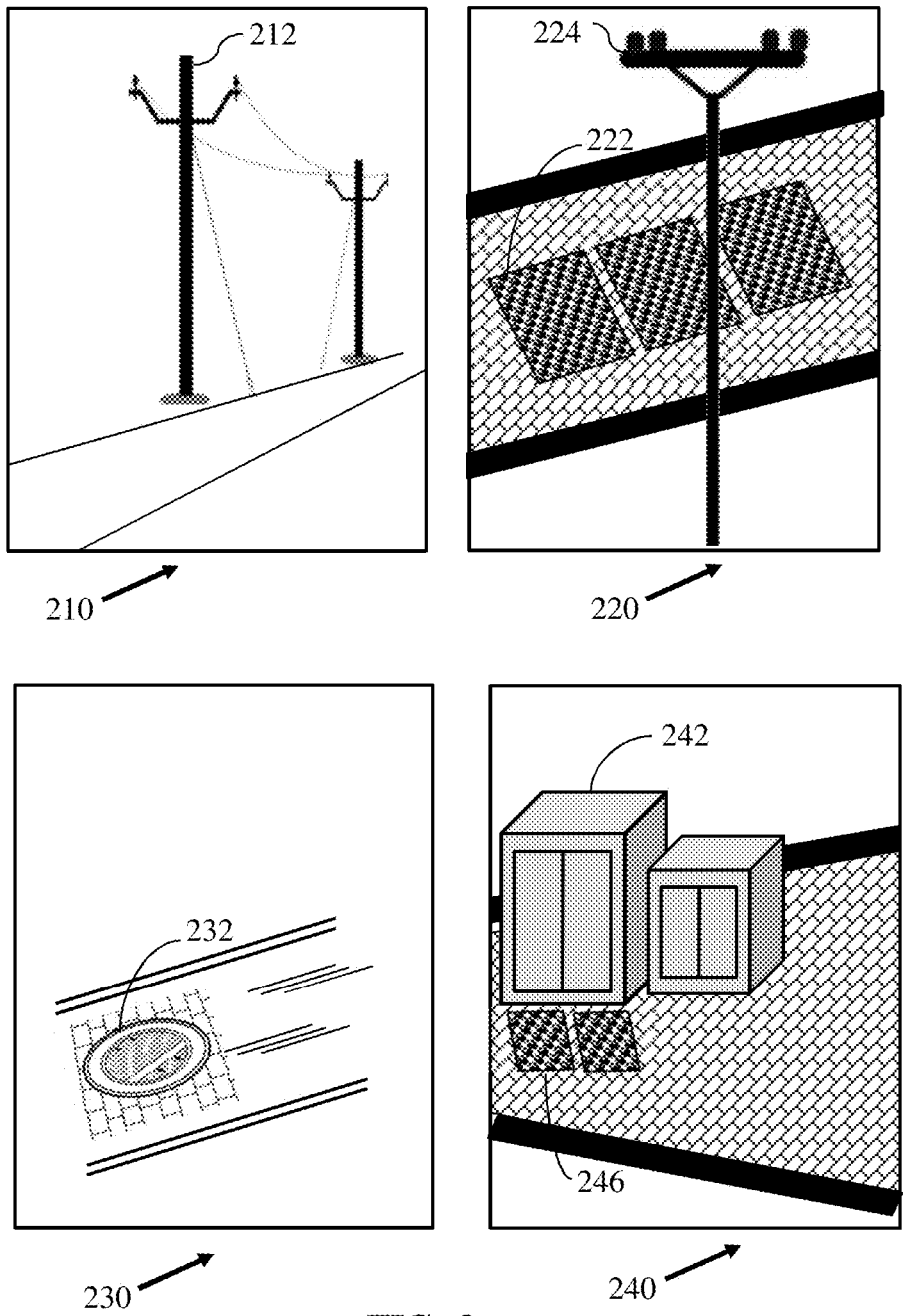
FIG. 2 illustrates examples of telecom assets for telecom inventory management.

FIG. 2 illustrate various examples of telecom assets for telecom inventory management, in accordance with an example embodiment. In the present example, the telecom assets are shown to include cabinets, manholes, joint boxes and poles. It will however be understood that the telecom assets may include additional telecom equipment without limiting to the aforementioned examples.

FIG. 2 illustrates a scene 210 with a pole 212, a scene 220 with a joint-box 222 occluded by a pole 224, a scene 230 with a manhole 232 and a scene 240 having cabinets 242 with joint-boxes 244 in the same image.

As illustrated, recognition becomes more challenging if the texture/color of the surrounding region around the object also shares similarity in appearance. In various embodiments, the disclosed telecom inventory management system applies vision based techniques (or object detection techniques) with Faster RCNN, and image triangulation based asset localization has to accurately detect the telecom assets in the scene of a geographical area.

Figure 3:
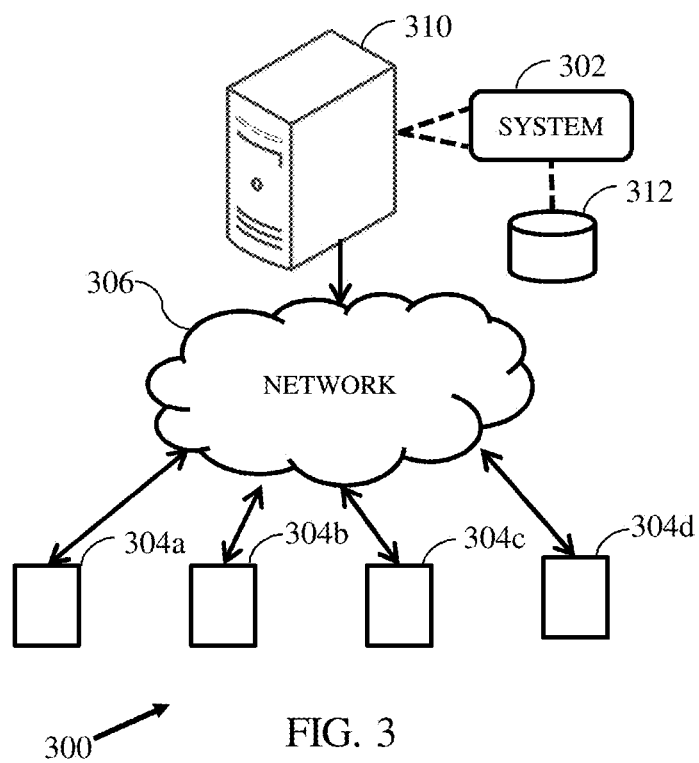
FIG. 3 illustrates a network implementation of telecom inventory management in accordance with some embodiments of the present disclosure.

Referring now to FIG. 3, a network implementation 300 of system 302 for telecom inventory management is illustrated, in accordance with an embodiment of the present subject matter. As will be explained in detail in later description, the system 302 implements a principled approach for inventory management of telecom assets which applies vision and machine learning techniques including deep features with Faster RCNN, and image triangulation based asset localization.

Although the present subject matter is explained considering that the system 302 is implemented for telecom inventory management, it may be understood that the system 302 may is not restricted to any particular environment. The system 302 can be utilized for a variety of domains where object detection is involved. The system 302 may be implemented in a variety of computing systems, such as a laptop computer, a desktop computer, a notebook, a workstation, a mainframe computer, a server, a network server, and the like.

Herein, the system 302 may receive the street-view images, for example, images captured from multiple devices and/or machines 304-1, 304-2 . . . 304-N, collectively referred to as devices 304 hereinafter. Examples of the devices 304 may include, but are not limited to, vehicle mounted camera device, a portable computer, a personal digital assistant, a handheld device, a workstation, VR camera embodying devices, storage devices equipped to capture and store the videos, and so on. In an embodiment, the devices 304 may include devices capable of capturing the images. The devices 304 are communicatively coupled to the system 302 through a network 306, and may be capable of transmitting the captured images to the system 302.

In one implementation, the network 306 may be a wireless network, a wired network or a combination thereof. The network 306 can be implemented as one of the different types of networks, such as intranet, local area network (LAN), wide area network (WAN), the internet, and the like. The network 306 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 306 may include a variety of network devices, including routers, bridges, servers, computing devices, storage devices, and the like. In an embodiment, the system 302 may be embodied in a computing device 310. Examples of the computing device 310 may include, but are not limited to, a desktop personal computer (PC), a notebook, a laptop, a portable computer, a smart phone, a tablet, and the like. The system 302 may also be associated with a data repository 312 to store the street-view images of the geographical location, and GPS data associated therewith. In an embodiment, the data repository may be stored configured outside and communicably coupled to the computing device 310 embodying the system 302. Alternatively, the data repository 312 may be configured within the system 302. An example implementation of the system 302 for telecom inventory management is described further with reference to FIG. 4.

Figure 4:
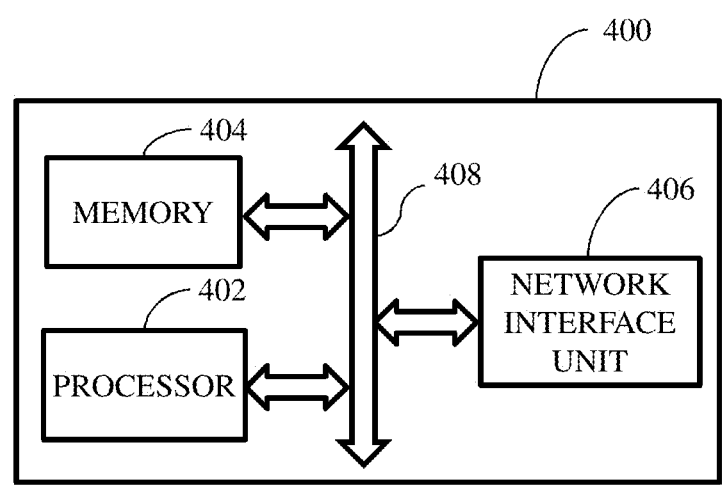
FIG. 4 illustrates a block diagram of a system for telecom inventory management according to some embodiments of the present disclosure.

FIG. 4 illustrates a block diagram of a system 400 for telecom inventory management, in accordance with an embodiment of the present disclosure. In an example embodiment, the system 400 may be embodied in, or is in direct communication with a computing device, for example the computing device 310 (FIG. 3). The system 400 includes or is otherwise in communication with one or more hardware processors such as a processor 402, one or more memories such as a memory 404, and a network interface unit such as a network interface unit 406. In an embodiment, the processor 402, memory 404, and the network interface unit 406 may be coupled by a system bus such as a system bus 408 or a similar mechanism.

The processor 402 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 402 thus may also include the functionality to encode messages and/or data or information. The processor 402 may include, among other things, a clock, an arithmetic logic unit (ALU) and logic gates configured to support operation of the processor 402. Further, the processor 402 may include functionality to execute one or more software programs, which may be stored in the memory 404 or otherwise accessible to the processor 402.

The one or more memories such as a memory 404, may store any number of pieces of information, and data, used by the system to implement the functions of the system. The memory 404 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 404 may be configured to store information, data, applications, instructions or the like for enabling the system 400 to carry out various functions in accordance with various example embodiments. Additionally or alternatively, the memory 404 may be configured to store instructions which when executed by the processor 402 causes the system to behave in a manner as described in various embodiments.

In an embodiment, the memory 404 includes a data repository to store street-view images for various geographical locations and an associated GPS data corresponding to said street-view images. It will be noted that the data repository may be embodied in a computing device (for example, the computing device 310 of FIG. 3) embodying the system 400. Alternatively, the data repository may be configured outside and communicatively coupled to the computing device.

The network interface unit 406 is configured to facilitate communication between the first and the second computing devices. The network interface unit 406 may be in form of a wireless connection or a wired connection. Examples of wireless network interface element 406 may include, but are not limited to, IEEE 802.11 (Wifi), BLUETOOTH®, or a wide-area wireless connection. Example of wired network interface element 406 includes, but is not limited to Ethernet.

Herein, the memory for example the memory 404 and the computer program code configured to, with the hardware processor for example the processor 402, cause the system 400 to perform various functions described herein under.

In an embodiment, the system 400 is caused to generate a UI, for example, the UI 406 that includes a region for displaying street-views. The UI 406 may allow inputting one or more parameters corresponding to a geographical area, and in response to said receipt of said parameters, display plurality of street-view images of the geographical area. In an embodiment, the system 400 may be caused to download a plurality of street-view images corresponding to given GPS co-ordinates and display said images via the UI 406. In an embodiment, for downloading the images, the system 400 may be caused to receive one or more parameters, and based on said parameters display download a plurality of street-view images of the geographical location. Examples of said parameters may include but are not limited to location (latitude/longitude value) of the geographical location, preferred size of the street-view image, Heading (0-360), horizontal field of view of the image capturing device used to capture the street-view images, pitch, and up and/or down angle of the camera relative to the GSV vehicle. The term 'heading' herein refers to orientation of the image capturing device to view an image within the range of angle of 0 to 360 degree at any point. Herein, it will be noted that the images corresponding to two consecutive GPS location coordinates in the plurality of street-view image may have finite degree of scene overlap from different camera angles which could be varying at different locations, as is illustrated and described with reference to FIG. 1.

The plurality of street-view images of the geographical area may have one or more telecom assets. The telecom assets may include, but are not limited to, cabinets, poles, manholes, and joint-boxes. The one or more telecom assets may be associated with corresponding GPS location coordinates. The system 400 may be caused to identify the telecom assets in the plurality of street view images. The telecom assets such as joint boxes and manholes are underground structures housing cable joints and/or equipment which can be accessed via a surface cover. Joint boxes and manholes can be situated in the footpath, verge or carriageway. Special cover variations exist for paved precinct and pedestrianized areas. Certain other telecom assets such as, cabinets and manholes are over ground assets. In an embodiment, the system is caused to apply an object recognition model to the plurality of street-view images to detect the telecom assets in the plurality of street-view images. As will be explained later in the description, detecting the telecom assets in the street-view images includes associating the telecom assets with corresponding asset labels.

The object recognition model facilitates in detection of telecom assets in the street-view images. Examples of object recognition models may include, but are not limited to Histogram of Oriented Gradients (HOG) with linear Support Vector Machine (SVM), Deformable Parts Model with linear SVM, and Faster RCNN. The performance of the system 400 using the aforementioned object recognition models is described further with reference to FIGS. 7A and 7B. Preferably, the system is caused to detect the telecom assets in the street-view images by using deep learning model, for example, a faster R-CNN detector.

In an embodiment, the system 400 is caused to train the object recognition model to detect and predict the telecom assets in a plurality of training images, prior to applying the object recognition model. Said plurality of training images may street-view images of various geographical areas. In an embodiment, the object recognition model identifies the telecom assets in the plurality of training images. During training of the object recognition model, the model is supplied with multiple training images, and each of the telecom assets in said training images are enclosed in a bounding box. Additionally, the location of the telecom assets in the training images may be marked, for example, by using GPS location coordinates of said telecom assets. Additionally, a corresponding label is assigned to each of the identified telecom assets enclosed in the bounding box. As disclosed herein, in an embodiment, a faster R-CNN detector may be utilized for the purpose of detection of telecom assets in the street-view images. For example, the R-CNN based detector may run on the street-view images and predicts different object appearing at all scales in said images. In an embodiment, the system 400 causes the faster R-CNN detector to assign confidence score to the prediction of telecom assets in the street-view images. In an embodiment, confidence score may be assigned based on a threshold value of prediction. In an embodiment, the threshold value of prediction may be predefined. For instance, a user may define the threshold value of prediction prior to detection of telecom inventory. The system may then be caused to identify the telecom assets that can be detected with confidence score equal to or greater than the threshold value of prediction.

It will be understood that faster RCNN is a combination of Region Proposal Networks (RPN) and Fast RCNN. An RPN is a fully convolutional network that predicts both object bounding boxes and objectness scores (confidence scores) at each position. The RPN is trained end-to-end to generate high-quality region proposals, which are used by Fast RCNN for detection. RPNs are designed to efficiently predict region proposals with a wide range of scales and aspect ratios. This approach directly solves a (n+1)-category problem i.e. labelling all proposals detected by RPN in n predefined classes, and the background is modelled as separate class.

In an alternate embodiment, the HoG model may be utilized for the purpose of detection of telecom assets in the street-view images. The HoG model presents rigid template based approach for object recognition, for example, recognition of telecom assets in the street-view images at various scales. The HoG model detector filters said images using fixed size template window by scanning in overlapping fashion at all positions and scales. Each template window is represented by distribution of orientations weighted by gradient magnitude. The HoG model models each asset category as a foreground object. Therefore, during the training, the HoG model learns four separate detectors, one for each asset type.

In yet another embodiment, a Deformable Parts Model (DPM) is utilized for training and detection of telecom assets in street-view images. The DPM facilitates in tackling the intra-category diversity in object detection. For example, since in the present disclosure, the objects (or the telecom assets) are taken from different viewpoints with variations in color, pose and illumination, the DPM based detector can facilitate in robust detection of telecom assets. In the present context, the DPM detector may be compared with the HOG based detector for detection of telecom assets based on latent discriminative learning of the object detection model and detection of multiple components with telecom assets (i.e. subcategories). The deformable parts are utilized to represent an object model using a lower-resolution root template, and a set of spatially flexible high-resolution part templates. Each part captures local appearance properties of an object, and the deformations are characterized by links connecting them. Latent discriminative learning involves an iterative procedure that alternates the parameter estimation step between the known variables (e.g., bounding box location of instances) and the unknown i.e., latent variables (e.g., telecom assets part locations, instance-component membership). Finally, the idea of subcategories is to segregate object instances into disjoint groups each with a simple (possibly semantically interpretable) theme e.g., frontal vs profile view, or sitting vs standard person, etc., and then learning a model per object/asset type. It will be understood that in the present context, the term 'object' refers to a telecom asset.

Each of the street-view images has associated GPS coordinates. However, the real world position of telecom assets may be different from the GPS coordinates of camera coordinates. In an embodiment, the street-view images annotated with asset labels are further processed for asset location identification using triangulation. In an embodiment, the system 400 is caused to estimate a real-world location of the telecom assets in the geographical area by applying triangulation method on a set of multi-view images selected from the plurality of street-view images The set of multi-view images those images from amongst the plurality of street-view images that are captured from a plurality of consecutive locations in vicinity of the one or more objects in the geographical area. For example, upon providing GPS coordinates of a geographical area, the system may retrieve multiple images of the geographical area, however, for the purpose of telecom asset management; the system is interested in only those images that contain one or more telecom assets captured from different angles. Such images of a scene having objects captured from different angles are referred to as multi-view images. The system selects the set of multi-view images captured from a plurality of consecutive locations in vicinity of the one or more telecom asset in the geographical area, and apply triangulation method on the set of multi-view images to estimate a real-world location of the one or more telecom assets in the geographical area.

In an embodiment, to estimate the real-world location of the telecom assets, the system 400 is caused to identify a plurality of point correspondences in the set of multi-view images using a matching model. The system 400 is further caused to estimate the real-world location of a telecom asset of the one or more telecom assets based at least on the plurality of point correspondences. The estimation of a real-world location of the one or more telecom assets in the geographical area is explained in further detail with reference to FIG. 6.

In an example implementation, the system 400 is caused to update the real-world location of the one or more telecom assets in the repository. For example, upon estimation of the real-world location, the system 400 may present a data correction screen. A marker may be placed at the inventory location in street-view presented on the correction screen. The marker may detail the data correction process. The system 400 may cause the data correction screen to be updated with generic details of the telecom asset such as latitude, longitude, asset type, street name, and so on The system 400 is caused to validate the GPS location coordinates of the one or more telecom assets based at least on the estimated real-world location. In an embodiment, validating the GPS location coordinates of the one or more assets includes comparing the GPS location coordinates of the telecom assets with the estimated real-world location. In an embodiment, the validation of the estimated real-world location is performed to determine an overlap between the ground truth object (for example, the telecom assets) and the object (or the telecom assets) detected by the disclosed system 400. In an embodiment, said overlap or validation can be performed by plotting precision-recall curves for object detection model employed by the system 400. An example of PR curves for various object detection models utilized for detection of telecom assets is described further with reference to FIG. 7A. In another embodiment, the validation can be performed by computing confusion matrix for the object detection models employed by the system 400. An example of computation of confusion matrices for various object detection models utilized for detection of telecom assets is described further with reference to FIG. 7B.

Figure 5:
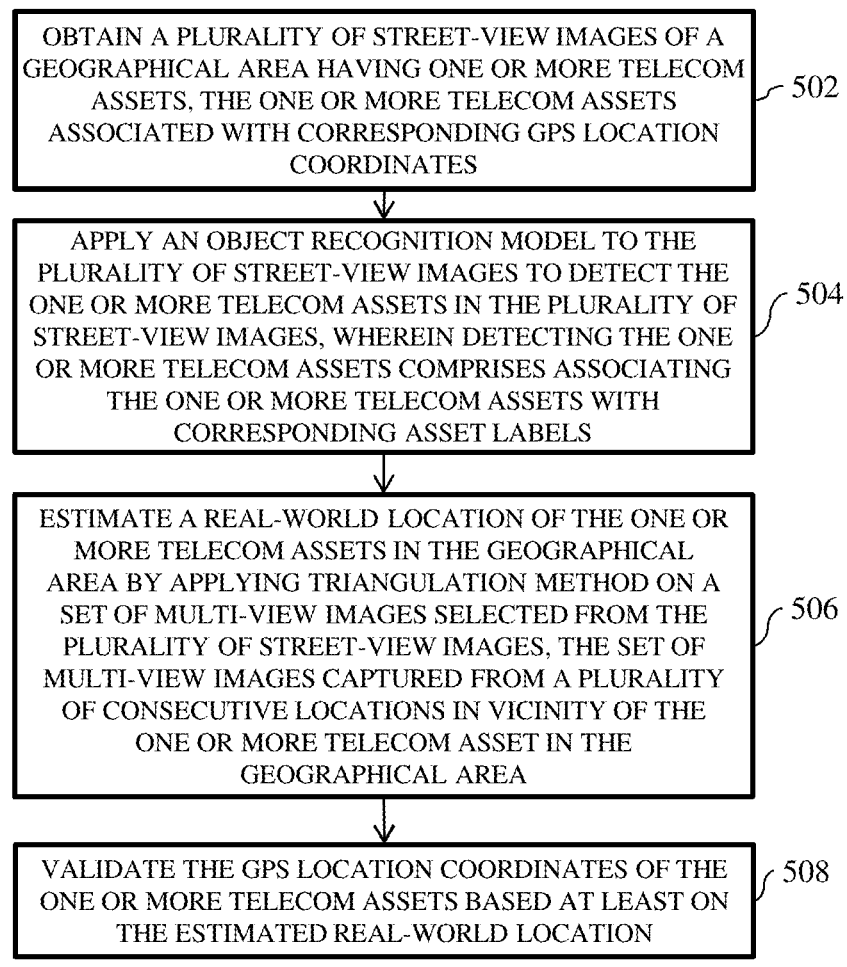
FIG. 5 illustrates a flow diagram of a method for telecom inventory management in accordance with some embodiments of the present disclosure.

FIG. 5 illustrates a flow diagram of a method 500 for telecom inventory management, in accordance with an example embodiment. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communication network. The order in which the method 500 is described is not intended to be construed as a limitation, and any number of the described method blocks can be combined in any order to implement the method 500, or an alternative method. Furthermore, the method 500 can be implemented in any suitable hardware, software, firmware, or combination thereof. In an embodiment, the method 500 depicted in the flow chart may be executed by a system, for example, the system 400 of FIG. 4. In an example embodiment, the system 400 may be embodied in a computing device, for example, the computing device 310 (FIG. 3).

At 502, the method 500 includes obtaining a plurality of street-view images of a geographical area having one or more telecom assets. The one or more telecom assets are associated with corresponding GPS location coordinates. Examples of telecom assets include, but are not limited to, cabinets, manholes, joint boxes and poles.

At 504, the method 500 includes applying an object recognition model to the plurality of street-view images to detect the one or more telecom assets in the plurality of street-view images. Detecting the one or more telecom assets includes associating the one or more telecom assets with corresponding asset labels. In an embodiment, examples of the object recognition model that can be applied to the street-view images may include, but are not limited to, HOG-SVM model, SVM model, and faster RCNN model. Example performance of the aforementioned object recognition models is described further with reference to FIGS. 7A and 7B.

In an embodiment, the method includes training the object recognition model to detect of the one or more telecom assets in a plurality of training images prior to applying the object recognition model. In an embodiment, training the object recognition model includes identifying the one or more telecom assets in the plurality of training images, such that each of the one or more telecom assets are enclosed in a bounding box in corresponding training image of the plurality of training images. Each of the identified one or more telecom assets enclosed in the bounding box are assigned a corresponding label. Further, for detection of the telecom assets, a bounding box containing a telecom asset of the one or more telecom assets is predicted in the set of multi-view images, and a corresponding asset label is assigned to the predicted bounding box based on a threshold value of prediction.

At 506, the method 500 includes estimating a real-world location of the one or more telecom assets in the geographical area by applying triangulation method on a set of multi-view images selected from the plurality of street-view images. The set of multi-view images are captured from a plurality of consecutive locations in vicinity of the one or more telecom asset in the geographical area. An example of capturing of the multi-view images is described with reference to FIG. 1.

At 508, the method 500 includes validating the GPS location coordinates of the one or more telecom assets based at least on the estimated real-world location. Herein, the validation of the estimated real-world location is performed to determine an overlap between the ground truth object (for example, the telecom assets) and the telecom assets detected by the object detection model. In an embodiment, said overlap or validation can be performed by plotting precision-recall (PR) curves for the object detection model. An example of PR curves for various object detection models utilized for detection of telecom assets is described further with reference to FIG. 7A. In another embodiment, the validation can be performed by computing confusion matrix for the object detection models. An example of computation of confusion matrices for various object detection models utilized for detection of telecom assets is described further with reference to FIG. 7B.

Figure 6:
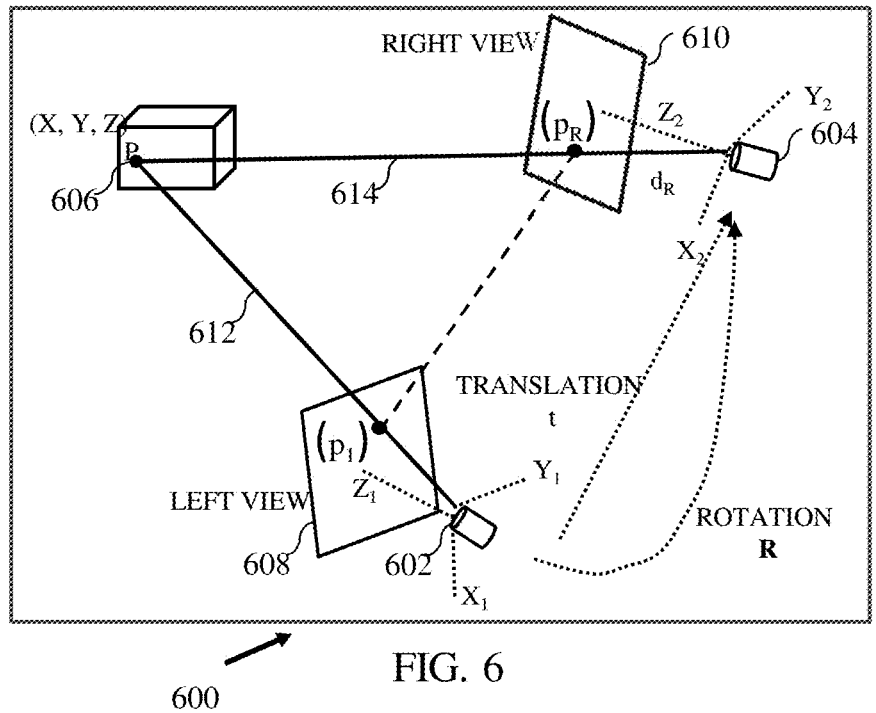
FIG. 6 illustrates an example representation of a set-up for estimation of a real-world location of telecom assets using triangulation method in accordance with some embodiments of the present disclosure.

FIG. 6 illustrates an example representation of a set-up 600 for estimation of a real-world location of telecom assets using triangulation method, in accordance with an example embodiment. As illustrated herein, the set-up 600 is shown to include multiple image capturing devices, for example a camera 602 and a camera 604 that are positioned to capture street-view images of an asset, for example a cabinet 606. The cameras 602, 604 are position at two different locations so as to capture the multiple views of the cabinet 606. For example, the camera 602 may capture an image 608 while the camera 604 may capture an image 610 of the cabinet 606.

Assuming that a point P on the cabinet 606 described by (X; Y; Z) in the world co-ordinate system is captured at position $p_L$ in the image plane of the camera 602, and at position $p_r$ in the image plane of camera 604. The depth of point P from two image views can be estimated by identifying a plurality of point correspondences in the set of multi-view images using a matching model. In order to obtain point correspondences between the set of multi-view images, the system may be caused to remove pre-process the multi-view images by removing projective distortions. In an embodiment, the system may receive multi-view images that may already be pre-processed for removing projective distortions. Herein, projective distortions may refer to distortion in images that are captured from two different views. Said distortion may be present due to rotation and/or translation of the views of the images. In certain scenarios, one of the images may contain some certain additional views that may not be present in other image. Removing align w.r.t each other facilitates in removing projective distortion in the images.

The point correspondences are determined by identifying the regions of images which are similar in the multi-view images 608 and 610. For points $p_l$ and $p_r$ in different views or images 608, 610 respectively, there are two rays 612, 614 in 3D space connecting with cameras center of projection at different locations. The distance of point P can be estimated by finding the 3D point $P_a$ that lies closest to 3D rays corresponding to the matching feature locations {p} from both the views. In an embodiment, SIFT based image matching features can be utilized for identifying the matching 3D point $P_a$. An advantage of using SIFT based matching is that SIFT based features applies set of local feature vectors computed on pixel gradients. Moreover, SIFT based matching embodies scale and illumination invariance and also returns partially matched regions.

Points pl and pr on different image planes are related as $$d_r \hat{p}_r = R(d_l \hat{p}_l) + t \qquad (1)$$

Here, $\hat{p}_l = K^{-1} p_l$ and $\hat{p}_r = K^{-1} p_r$ are ray direction vectors connecting P to projection centers of camera 602 and camera 604.

K represents the camera calibration parameter,

R and t is the rotation matrix and translation vector between two camera positions.

The simplification of equation (1) gives the following condition which is defined as epipolar constraint:

$$\hat{p}_r^T E \hat{p}_l = 0 \qquad (2)$$

E is defined as the essential matrix computed as cross product of t and R. Equation 2 can be rewritten as:

$$p_r^T F p_l = 0 \quad (3)$$

Here F is defined as the fundamental matrix. For a set of n matching points in p, we have n homogenous equations such as for $i^{th}$ match is as follows:

$$[p_{li} \; q_{li} \; 1] \begin{bmatrix} f_{11} & f_{12} & f_{13} \\ f_{21} & f_{22} & f_{23} \\ f_{31} & f_{32} & f_{33} \end{bmatrix} \begin{bmatrix} p_{ri} \\ q_{ri} \\ 1 \end{bmatrix} = 0 \quad (4)$$

Equation 4 can be solved using normalized 8-point algorithm. The factorization of F as equation (5) returns the epipole vector e and corresponding homography H.

$$F = [e] \times H \quad (5)$$

The factorization is not unique and can be obtained by different methods including direct approach, and SVD. With the valid homography H, projection matrices $P_o$ and $P'_o$ can be computed as:

$$P_o = [I|0], \text{ and } P'_o = [e|H] \quad (6)$$

Matrix $P_o$ and $P'_o$ define the relationship between real-world point P and its projections on images planes of cameras 702, 704 as:

$$p_l = P_o P, \; p_r = P'_o P \quad (7)$$

The equation (7) can be solved to estimate the location of P. Using the retrieved co-ordinates, and GPS values of camera positions, the actual position of the telecom asset, for example the cabinet 606 can be estimated with reasonable accuracy.

Figure 7A:
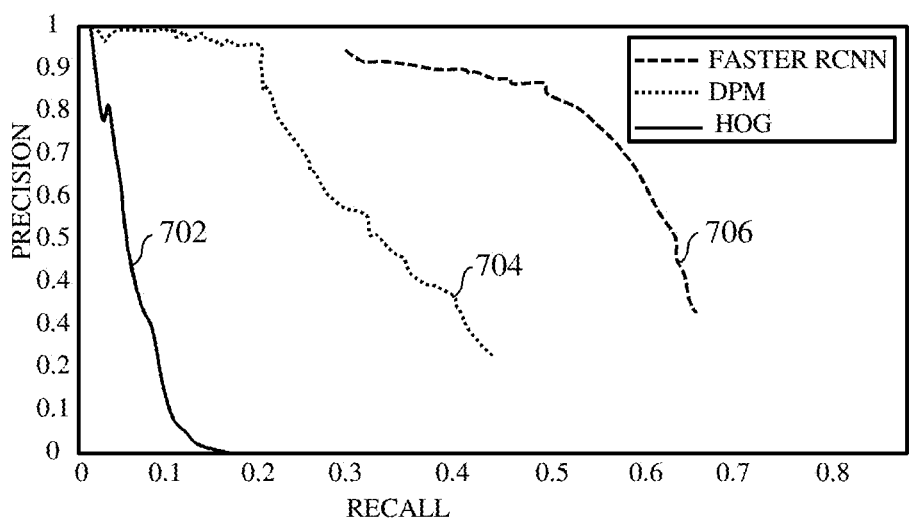
FIG. 7A illustrates Precision Recall (PR) curves for various object detection models employed to detect telecom assets in accordance with some embodiments of the present disclosure.

FIG. 7A illustrates PR curves for various object detection models employed to detect telecom assets, in accordance with various embodiments. Specifically, FIG. 7A illustrates precision-recall curves for 3 object detection models, namely HoG detector with linear SVM (illustrated by curve 702), deformable parts based models (DPM) with Linear SVM (illustrated by curve 704), and Faster RCNN with RPN (illustrated by curve 706) for generating proposals/predictions for telecom assets.

Herein, PR curves are selected as $N_{neg} >> N_{pos}$, where $N_{neg}$; $N_{pos}$ are number of negatives and positives in real scenarios. In addition, an F1 score is determined for each of the curves. The F1 score summarizes the performance of the precision-recall curves in a single number. Values of P and R, at highest values of F1 score for the three object detection model are illustrated in the table blew:

| Method | Precision | Recall | F₁ Score |
| --- | --- | --- | --- |
| HoG with Linear SVM | 0.2711 | 0.0896 | 0.1347 |
| DPM | 0.4983 | 0.3664 | 0.4233 |
| Faster RCNN | 0.7633 | 0.6312 | 0.6910 |

As is illustrated in the table above, faster RCNN provides best precision, recall and also F1 score, the factors that are used to evaluate the performance of a detector, in comparison to HoG and DPM detectors.

FIG. 7B illustrate a confidence matrix heat map plot 750 for various object detection models employed to detect telecom assets, in accordance with various embodiments. In particular, the confusion matrix 750 is for the proposed method when the maximal F1 score is achieved. The confusion matrix heat map plot 750 (hereinafter referred to as confusion matrix 750) depicts that the Cabinets, Joint-box and manholes have been efficiently detected as we observe along the diagonal. Additionally, the cabinets and joint-box are efficiently detected.

The last row of the confusion matrix 750 includes the detections which were missed out as background by the proposal detection by RPN. Similarly, the last column of the confusion matrix 750 refers to the removal of detected proposals or predictions of telecom assets which included some false positives i.e. backgrounds, by correct labelling by RCNN. The values in the last column are remarkably lower than the corresponding entry in the dominant diagonal of the matrix which establishes the efficacy of Faster-RCNN model in present application scenario of telecom inventory management. While Joint-box and manholes have also been detected reasonably well, some cases show confusion for some manholes were categorized as joint-boxes and some manholes categorized as joint-boxes as both of which are underground assets and lie on the footpath and visually very similar as seen the third row of the confusion matrix 750.

Various embodiments provide method and system for telecom inventory management. The disclosed system is capable of automatically detecting telecom assets via multi object recognition and localisation using street-view images of a geographical area. The disclosed method utilizes computer vision and machine learning techniques and models to (a) discover the missing assets through asset recognition and a localization pipeline which was hitherto done through traditional survey process, and (b) update new assets. The disclosed method or pipeline is not only intended to reduce the use of manpower, but also reduced the overall survey costs. A significant advantage of the disclosed embodiments is selection of an object detection model for detecting the telecom assets. It has been determined that faster RCNN is determined to be most robust object detection model in the present scenario.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for telecom inventory management, the method comprising:
   obtaining a plurality of street-view images, captured using an image capturing device, of a geographical area having one or more telecom assets, via one or more hardware processors, the one or more telecom assets associated with corresponding Global Positioning System (GPS) location coordinates;
   applying an object recognition model to the plurality of street-view images to detect the one or more telecom assets in the plurality of street-view images, via the one or more hardware processors, wherein detecting the one or more telecom assets comprises associating the one or more telecom assets with corresponding asset labels;
   estimating a real-world location of the one or more telecom assets in the geographical area by applying triangulation method on a set of multi-view images selected from the plurality of street-view images that uses a plurality of cameras positioned at different locations from the one or more telecom assets and to identify a plurality of point correspondences in the set of multi-view images using a matching model, via the one or more hardware processors, the set of multi-view images captured from a plurality of consecutive locations in vicinity of the one or more telecom assets in the geographical area; and
   validating, via the one or more hardware processors, the GPS location coordinates of the one or more telecom assets based at least on the estimated real-world location.

2. The method of claim 1, wherein the one or more telecom assets comprises joint boxes, manholes, cabinets and poles.

3. The method of claim 1, wherein the object recognition model comprises one of Histogram of Oriented Gradients (HOG)-Support Vector Machine (SVM) model, SVM model, and faster RCNN model.

4. The method of claim 1, further comprising, prior to applying the object recognition model, training the object recognition model to detect of the one or more telecom assets in a plurality of training images.

5. The method of claim 4, wherein training the object recognition model comprises:
   identifying the one or more telecom assets in the plurality of training images, wherein each of the one or more telecom assets being enclosed in a bounding box in corresponding training image of the plurality of training images; and
   assigning a corresponding label to each of the identified one or more telecom assets enclosed in the bounding box.

6. The method of claim 1, wherein applying the object recognition model to detect the one or more telecom assets in the plurality of street-view images comprises: predicting, in the set of multi-view images, a bounding box containing a telecom asset of the one or more telecom assets and the corresponding asset label; and assigning a confidence score to the predicted bounding box based on a threshold value of prediction.

7. The method of claim 1, wherein validating the GPS location coordinates of the one or more telecom assets comprises comparing the GPS location coordinates of the one or more assets with the estimated real-world location.

8. The method of claim 1, further comprising updating the GPS location coordinates of the telecom asset based on the estimated real-world location.

9. A system for telecom inventory management, the system comprising:
   one or more memories; and
   one or more hardware processors, the one or more memories coupled to the one or more hardware processors, wherein the one or more hardware processors is configured by programmed instructions stored in the one or more memories to:
   obtain a plurality of street-view images, captured using an image capturing device, of a geographical area having one or more telecom assets, the one or more telecom assets associated with corresponding GPS location coordinates;
   apply an object recognition model to the plurality of street-view images to detect the one or more telecom assets in the plurality of street-view images, wherein detecting the one or more telecom assets comprises associating the one or more telecom assets with corresponding asset labels;
   estimate a real-world location of the one or more telecom assets in the geographical area by applying triangulation method on a set of multi-view images selected from the plurality of street-view images that uses a plurality of cameras positioned at different locations from the one or more telecom assets and to identify a plurality of point correspondences in the set of multi-view images using a matching model, the set of multi-view images captured from a plurality of consecutive locations in vicinity of the one or more telecom asset in the geographical area; and
   validate the GPS location coordinates of the one or more telecom assets based at least on the estimated real-world location.

10. The system of claim 9, wherein the one or more telecom assets comprises joint boxes, manholes, cabinets and poles.

11. The system of claim 9, wherein the object recognition model comprises one of HOG-SVM model, SVM model, and faster RCNN model.

12. The system of claim 9, wherein prior to applying the object recognition model, the one or more hardware processors are further configured by the instructions to train the object recognition model to detect of the one or more telecom assets in a plurality of training images.

13. The system of claim 12, wherein training the object recognition model, the one or more hardware processors are further configured by the instructions to:
   identify the one or more telecom assets in the plurality of training images, wherein each of the one or more telecom assets being enclosed in a bounding box in corresponding training image of the plurality of training images; and assign a corresponding label to each of the identified one or more telecom assets enclosed in the bounding box.

14. The system of claim 9, wherein to apply the object recognition model to detect the one or more telecom assets in the plurality of street-view images the one or more hardware processors are further configured by the instructions:
   predict, in the set of multi-view images, a bounding box containing a telecom asset of the one or more telecom assets and the corresponding asset label; and
   assign a confidence score to the predicted bounding box based on a threshold value of prediction.

15. The system of claim 9, wherein to validate the GPS location coordinates of the one or more telecom assets, the one or more hardware processors are further configured by the instructions to compare the GPS location coordinates of the one or more assets with the estimated real-world location.

16. The system of claim 9, wherein the one or more hardware processors are further configured by the instructions to update the GPS locations of the telecom asset based on the estimated real-world location.

17. A non-transitory computer-readable medium having embodied thereon a computer program for executing a method for telecom inventory management, the method comprising:
   obtaining a plurality of street-view images, captured using an image capturing device, of a geographical area having one or more telecom assets, via one or more hardware processors, the one or more telecom assets associated with corresponding Global Positioning System (GPS) location coordinates;
   applying an object recognition model to the plurality of street-view images to detect the one or more telecom assets in the plurality of street-view images, via the one or more hardware processors, wherein detecting the one or more telecom assets comprises associating the one or more telecom assets with corresponding asset labels;
   estimating a real-world location of the one or more telecom assets in the geographical area by applying triangulation method on a set of multi-view images selected from the plurality of street-view images that uses a plurality of cameras positioned at different locations from the one or more telecom assets and to identify a plurality of point correspondences in the set of multi-view images using a matching model, via the one or more hardware processors, the set of multi-view images captured from a plurality of consecutive locations in vicinity of the one or more telecom assets in the geographical area; and
   validating, via the one or more hardware processors, the GPS location coordinates of the one or more telecom assets based at least on the estimated real-world location.

* * * * *